(12) United States Patent
Wedderburn et al.

(10) Patent No.: US 10,130,200 B2
(45) Date of Patent: *Nov. 20, 2018

(54) UTENSIL

(71) Applicant: R & D CONSULTING PROFESSIONALS INC., Moncton (CA)

(72) Inventors: James Wedderburn, Moncton (CA); Mark Bonner, Frenchtown, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/044,200

(22) Filed: Oct. 2, 2013

(65) Prior Publication Data
US 2014/0245614 A1    Sep. 4, 2014

Related U.S. Application Data

(63) Continuation of application No. 12/448,984, filed as application No. PCT/CA2007/001287 on Jul. 20, 2007, now Pat. No. 8,584,366.

(51) Int. Cl.
| | |
|---|---|
| *A47G 21/02* | (2006.01) |
| *A47J 43/28* | (2006.01) |
| *A47G 21/08* | (2006.01) |

(52) U.S. Cl.
CPC ........... *A47G 21/023* (2013.01); *A47G 21/08* (2013.01); *A47J 43/28* (2013.01)

(58) Field of Classification Search
CPC ........ A47G 21/023; A47G 21/08; A47J 43/28
USPC .... 30/128–129, 323, 326, 227; 294/50, 131; 15/256.5; 56/400.1; D7/683, 686, 688; 425/286

See application file for complete search history.

(56) References Cited

U.S. PATENT DOCUMENTS

| | | | | |
|---|---|---|---|---|
| 411,988 A | * | 10/1889 | Harrington | 30/326 |
| 1,065,997 A | * | 7/1913 | Bentley | A47G 21/023 |
| | | | | 294/50 |
| 3,884,456 A | * | 5/1975 | Lew | A47G 21/103 |
| | | | | 267/156 |

FOREIGN PATENT DOCUMENTS

| | | | | |
|---|---|---|---|---|
| WO | W 03/055363 | * | 7/2003 | A47G 21/02 |
| WO | WO 03/055363 | * | 7/2003 | A47G 21/02 |

OTHER PUBLICATIONS

Flexure defintion; https://www.merriam-webster.com/dictionary/flexure.*

* cited by examiner

*Primary Examiner* — Laura M Lee

(57) ABSTRACT

A serving utensil comprises a handle having a gripping portion that is gripped by the user, A serving receptacle is operatively connected to the handle. There is mounted to the serving utensil a serving scraper having a resilient arm with a bowed shape. The resilient arm has a scraping end and a mounting end. A mounting means at the mounting end is for mounting the resilient arm to the serving utensil forwardly of the gripping portion of the utensil used to grip the utensil and rearwardly of the serving-receptacle. A scraper-remover is disposed at the scraper end of the resilient arm so that food can be scraped off of the food receptacle of the utensil when the serving scraper is actuated by the user.

6 Claims, 13 Drawing Sheets

Stress vs. Strain curve for: (DUCTILE MATERIALS)

* 1 - Ultimate Strength
* 2 - Yield Strength
* 3 - Rupture
* 4 - Strain hardening region
* 5 - Necking region

UTENSIL

CROSS-REFERENCE TO RELATED APPLICATIONS

This application is a continuation of U.S. patent application Ser. No. 12/448,984, filed Jul. 20, 2009, which is a National Stage Entry of International Application No. PCT/CA2007/001287, filed on Jul. 20, 2007, which claims priority from United States Provisional Patent Application Ser. No. 60/831,559 filed on Jul. 20, 2006, all of which are incorporated herein by reference in their entireties.

BACKGROUND OF THE INVENTION

Field of the Invention

The present invention relates to utensils, and more particularly to dispensing utensils.

Description of the Prior Art

Serving utensils have long been used for food service. When food is served onto individual plates, however, food sometimes sticks or clumps onto the utensil and can only be removed by awkward assistance of another utensil or object.

Attempts have been made in the prior art to provide dispensing utensils that have mechanisms which scrape the food from the utensil's serving receptacle. Such devices are shown in U.S. Pat. No. 1,065,433 issued to G. Dow et al.

Dow teaches a serving utensil with a food pushing spring arms incorporated into the handle. The handle is squeezable in the vertical plane to move the food ejector forwardly and push food off of the serving receptacle. This type of device, however, does have some awkwardness in use. The handle is comprised of two arms angularly arranged and resiliently connected to each other. It is not as easy to hold these types of handles and one has to be careful not to squeeze the handle when food is in the receptacle and ejection is not desired.

There are also devices such as those taught in U.S. Pat. No. 1,816,904 issued to Heimroth wherein the handle for service is comprised of two arms but the handle arms act on parallel planes. As well, in Heimroth, there are resiliently arranged vertical arms that can be squeezed in the horizontal direction to push the food off of the server-receptacle. This arrangement is awkward because of its size and it also requires the user to move his/her hand from the handle to surround the vertical arms and squeeze them or to operate the device with two hands.

The art would be advanced if there was a device which had a firm handle, and that had a serving scraper mounted onto the device which could be activated without the user having to substantially release or alter his/her grip on the handle to scrap the food off of the utensil's receptacle.

SUMMARY OF THE PRESENT INVENTION

It is an object of the present invention to provide a serving scraper for a serving utensil which is mounted to the utensil forwardly of where the user grips the utensil and is easily operable without compromising the user's grip on the handle.

It is another object of the present invention to provide a serving utensil with a handle, a serving receptacle and a serving scraper for removing food from the receptacle wherein the serving scraper is mounted forwardly of where the user grips the serving utensil and is easily operable without compromising the user's grip on the handle.

It is yet another object of the present invention to provide a serving scraper for a serving utensil that is easy to use, simple in design and easy to manufacture.

It is yet another object of the present invention to provide a serving utensil with a handle, a serving receptacle and a serving scraper for removing food from the receptacle that is easy to use, simple in design and easy to manufacture.

It is yet another object of the present invention to provide a serving utensil having a compact design for such a serving utensil, which minimizes the overall size and bulk of this type of utensil as well as minimizing the hand motion needed in order to fully actuate the utensils scraping or pushing mechanism.

Other objects will be apparent from reading the specification.

In accordance with one aspect of the present invention, there is provided a serving utensil comprising: a handle having a gripping portion for gripping the serving utensil; a food receptacle attached to the handle; and a resilient arm having a mounting end and a scraping end. The resilient arm is mountable at the mounting end to the handle to extend upwardly and away from the food receptacle and then continue to extend forwardly, past the mounting end and downwardly toward the food receptacle. The resilient arm is resiliently deformable downwardly and forwardly to cause the resilient arm adjacent the scraping end to push food off of the food receptacle.

In accordance with another aspect of the present invention, there is provided a serving utensil comprising: a handle having a gripping portion for gripping the serving utensil; a food receptacle attached to the handle; a removal means for removing food from the food receptacle; an elongate interconnection portion and a resilient arm having a mounting end and a scraping end. The removal means is mounted on the handle at the mounted end and the elongate interconnecting portion operatively connects the resilient arm to the removal means. The resilient arm is disposed to extend upwardly and away from the food receptacle and then continue to extend forwardly, past the mounting end and downwardly to attach to the elongate interconnecting means. The resilient arm is resiliently deformable downwardly and forwardly to cause the resilient arm adjacent the elongate interconnecting portion to move forwardly and cause the removal means to operate.

In accordance with yet another aspect of the present invention, there is provided a resilient arm mountable to a serving utensil forwardly of the gripping portion and rearwardly of the serving receptacle of the serving utensil comprising: an arm member with a bowed shape and having a scraping end and a mounting end; a mounting means at the mounting end for mounting the arm member to the serving utensil forwardly of the portion of the utensil used to grip the utensil and rearwardly of the serving receptacle; and a scraper disposed at the scraping end so that food can be scraped off of the food receptacle of a utensil when the arm member is mounted to the utensil. The bowed shape of the resilient arm is shaped to extend rearwardly from the mounting means, then upwardly and then forwardly to the scraping end and can be actuated by being resiliently deformed.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described herein below.

BRIEF DESCRIPTION OF THE DRAWING

The novel features which are believed to be characteristic of the utensil according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF THE PRESENT INVENTION

Figure 1A:
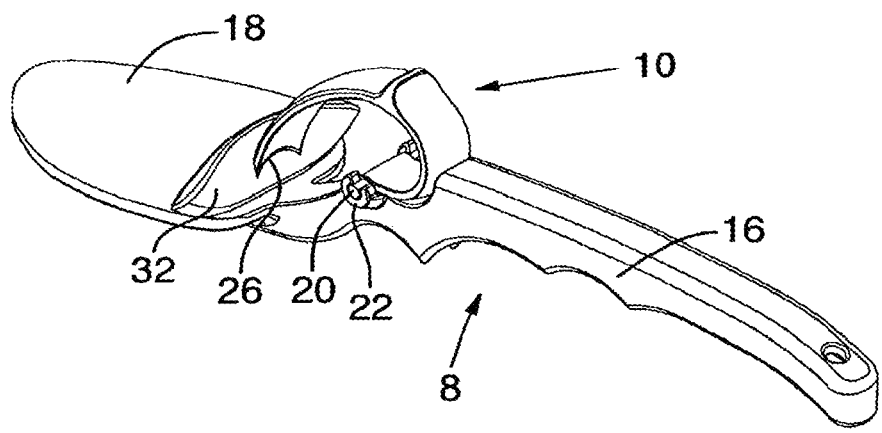
FIG. 1A illustrates a perspective view of the first embodiment of this invention showing the serving utensil as a spoon.
Figure 1B:
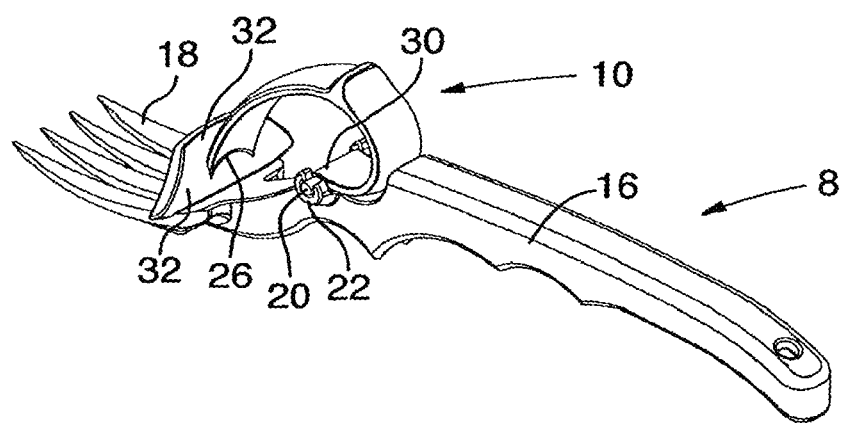
FIG. 1B illustrates a perspective view of an alternative embodiment to the first embodiment of this invention showing the serving utensil as a fork.
Figure 2:
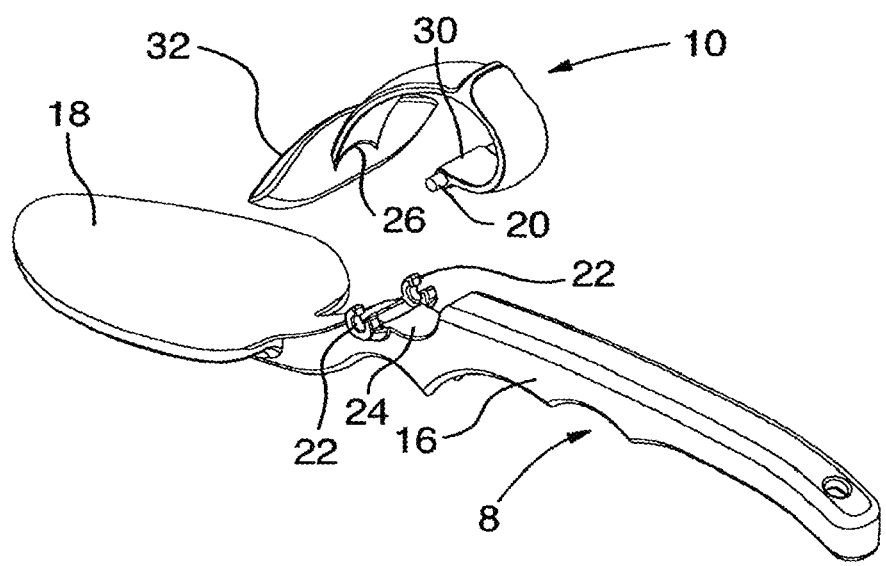
FIG. 2 illustrates an exploded perspective view of the first embodiment of this invention showing the resilient arm removed from the handle.

Referring to the embodiments illustrated in FIGS. 1 and 2, there is shown a serving utensil, having a handle, generally referred to by the numeral 8, and a resilient arm, generally referred to by the numeral 10. In FIGS. 1A, 2, 4A, 5A, 6A and 7A, the serving utensil is a spoon, and in FIGS. 1B, 7B and 9, the serving utensil is a fork. Whether the serving utensil is a spoon or a fork, this invention has equal application and like parts of the two different utensils and different embodiments will be referred to using the same numbers.

The serving utensil has a gripping portion 16 which forms part of the handle. The gripping portion 16 is where the user picks up and holds the utensil during serving. Each serving utensil 8 also has a food receptacle 18. For the spoons illustrated, the food receptable 18 is a concave cradle for scooping and holding food, whereas, for hte forks illustrated, the food receptable 18 is formed with prongs for picking and holding the food.

As shown, for mounting the resilient arm 8, there is formed on both the forks and the spoons, a male hinge members 20, which are lateral in disposition to the direction of the length of the utensil. The male hinge members 20 provide for the snap-mounting of the resilient arm 10 by use of complimentarily engageable female hinge members 22 formed on the handle. Adjacent the male hinge members 20 in the embodiments of FIGS. 1 to 6 and 9, but not in the embodiments of FIGS. 7 and 8, there is also provided a curved seating surface 24 (extending downwardly toward the food receptacle) which will provide a support for the resilient arm 10 when mounted onto the fork or spoon as shown in FIG. 1. The elevation of the seating surface 24, from a design point of view, is preferably sloped to be disposed at a lower elevation than the gripping portion 16 of the handle to facilitate easier finger actuation of the resilient arm 10, during use. It is also easier to assert pressure from the thumb in the downward-forward direction than purely in the forward direction in the context of operating this type of utensil. However, although a preferable design feature which adds to the utility, the invention has utility without this feature as well as shown in FIGS. 7 and 8 with the independent mounting means.

The resilient arm 10 of the first embodiment is illustrated apart from the spoon in FIG. 2. The resilient arm 10 is bowed in shape. The resilient arm 10 has a scraping end 26 and a mounting end 30.

There is a scraper-remover 32 for removing food from the food receptacle 18, formed at the scraping end 26 of the resilient arm 10 and there is a mounting means for mounting the resilient arm 10 to the handle of the spoon or fork at the male hinge member 20, by snapping the female hinge member 22 onto the male hinge member 20.

Preferably, the resilient arm 10 with a thumb locator 34 to provide the user with traction when the resilient arm 10 is flexed during the serving process. As well, the resilient arm 10 is configured to extend upwardly and away from the food receptacle 18. This shaping has been found to be the most ergonomic in providing for the easy placement of the thumb and movement of the thumb forwardly to resiliently deform the resilient arm downwardly and forwardly to cause the resilient arm adjacent the scraping end 26 to push food off of the food receptacle 18. It will be apparent that the user does not have to move his/her finger forwardly the complete length of distance of the receptacle. A mechanical advantage can be achieved by the disposition of the curvature of the resilient arm 10 as required by the designer's circumstances and needs.

Figure 3A:
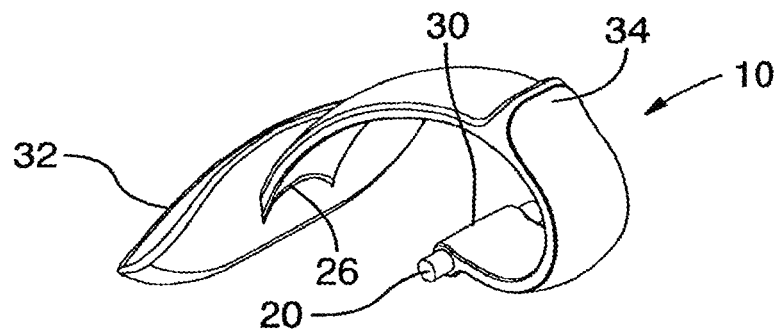
FIG. 3A illustrates a perspective view of the resilient arm.

It is also preferable to form the resilient arm as being curved in cross-section as illustrated in FIG. 3A. The curved disposition in cross section provides for added rigidity.

Figure 3B:
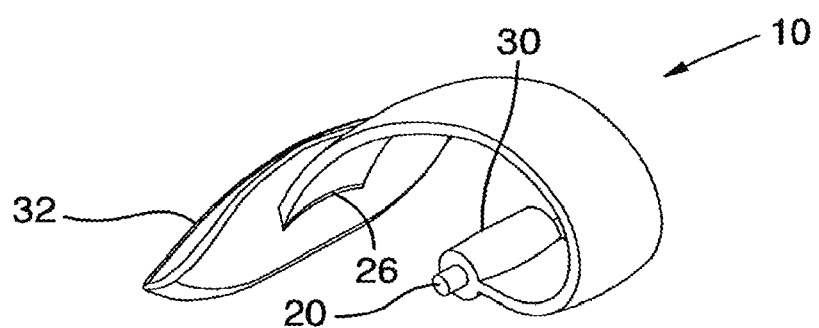
FIG. 3B illustrates a perspective view of a resilient arm that is an alternative embodiment of the resilient arm shown in FIG. 3A.
Figure 3C:
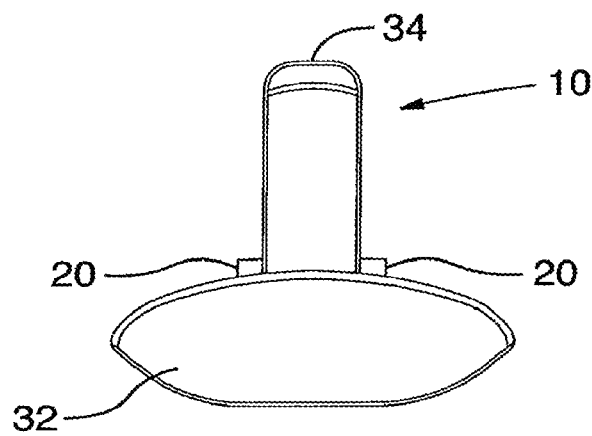
FIG. 3C illustrates a front view of the resilient arm of FIG. 3A.
Figure 3D:
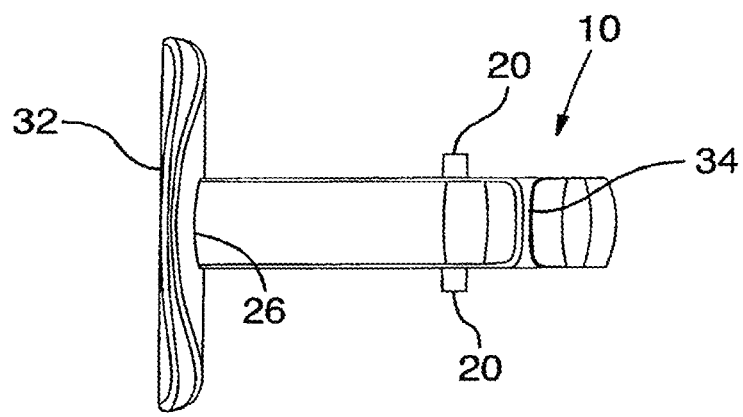
FIG. 3D illustrates a top view of the resilient arm of FIG. 3A.
Figure 3E:
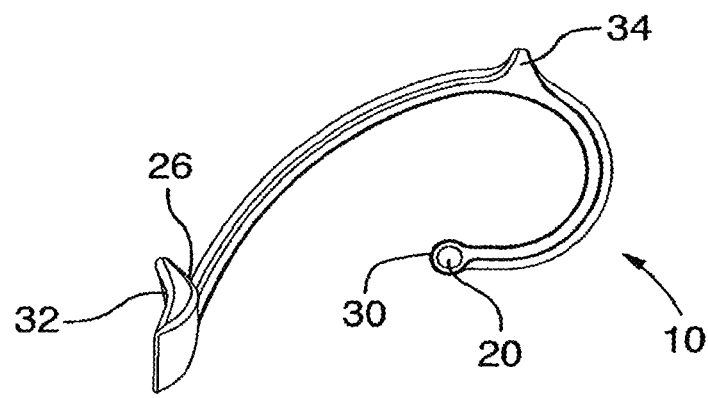
FIG. 3E illustrates a side view of the resilient arm of FIG. 3A.

However, the curved disposition in cross section, although preferable, is not essential. A resilient arm 10 with neither the thumb locator 34 nor the curved cross sectional disposition is illustrated in FIG. 3B.

Figure 5A:
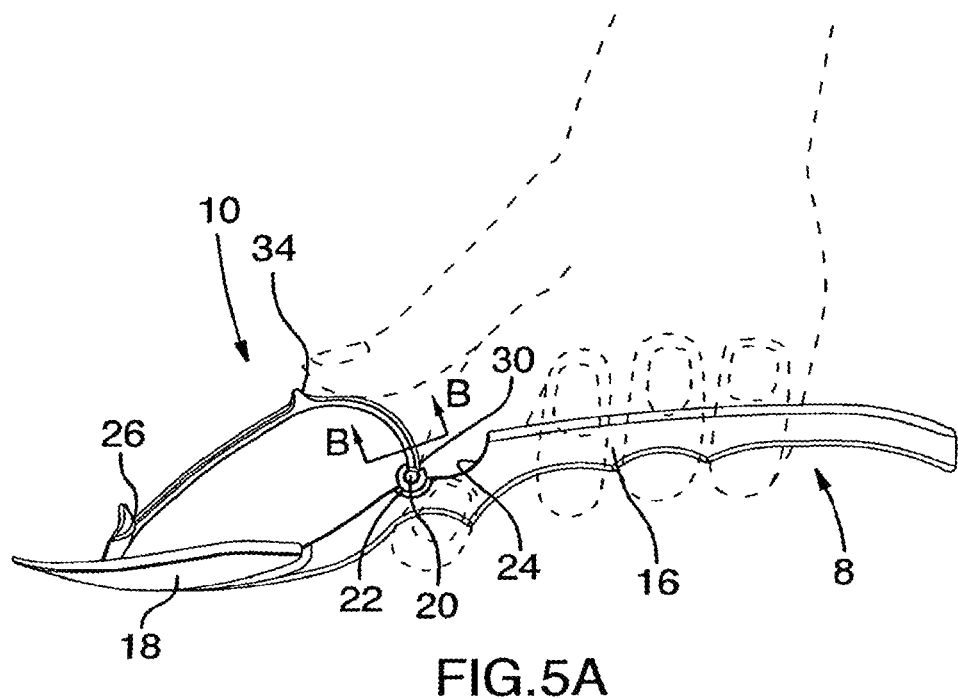
FIG. 5A illustrates a side view of the spoon of FIG. 4A wherein the resilient arm is partially extended moving the scrapping end forwardly of the position shown in FIG. 4A.
Figure 5B:
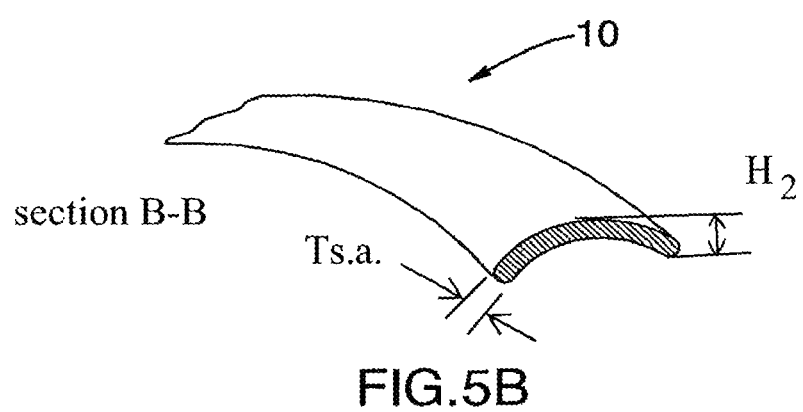
FIG. 5B is a cross section taken along lines B-B of FIG. 5A.
Figure 6A:
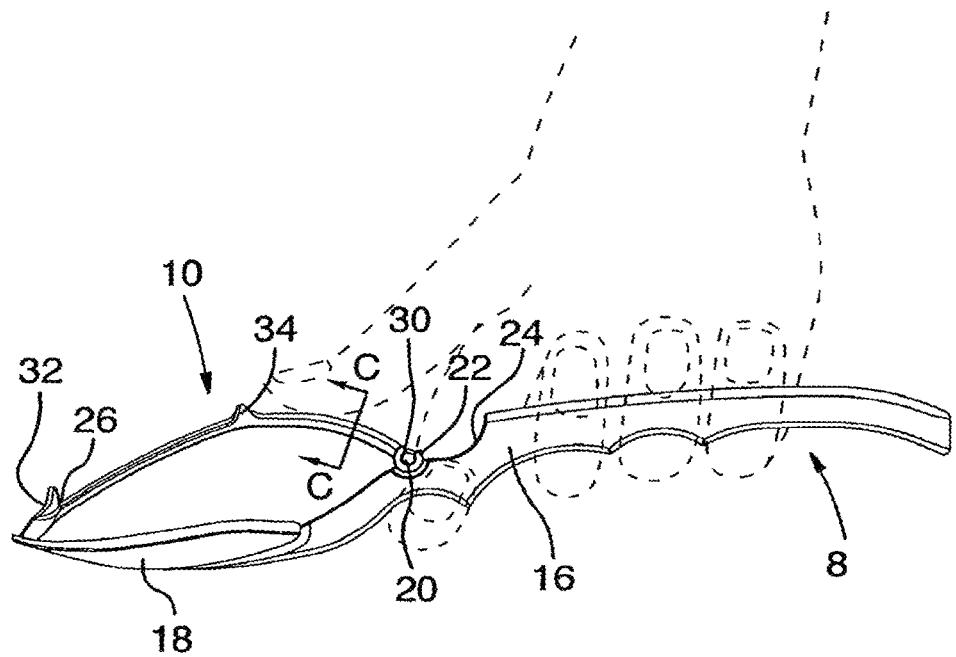
FIG. 6A illustrates a side view of the spoon of FIG. 4A wherein the resilient arm is extended to have moved the scrapping end to the outer edge of the food receptable.
Figure 6B:
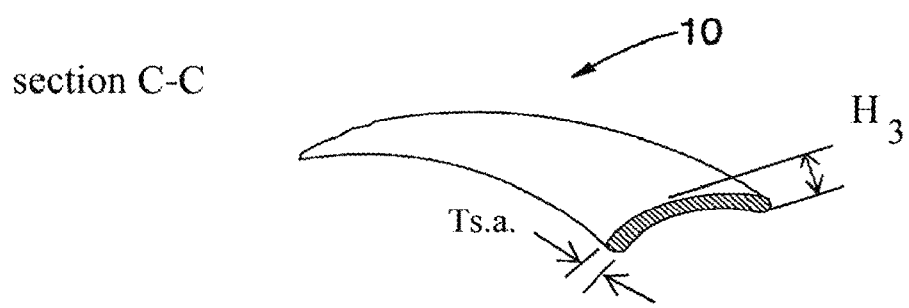
FIG. 6B is a cross section taken along lines C-C of FIG. 6A.
Figure 7A:
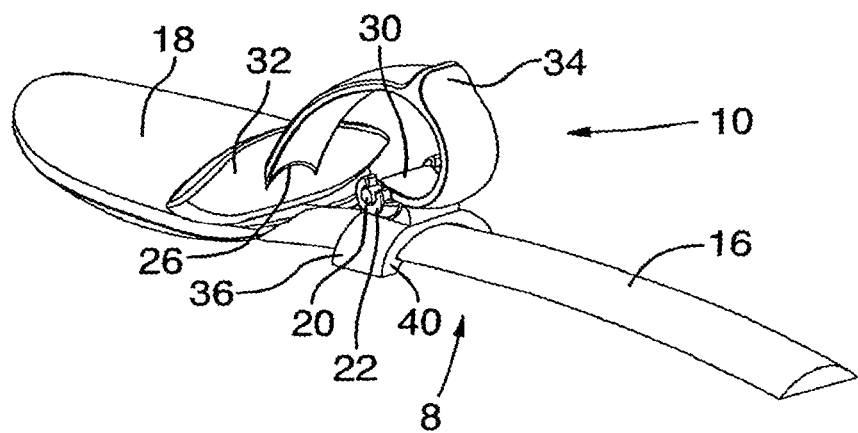
FIG. 7A is a perspective illustration of a further embodiment of this invention for a spoon with an attachable and detachable hub mounting means.
Figure 7B:
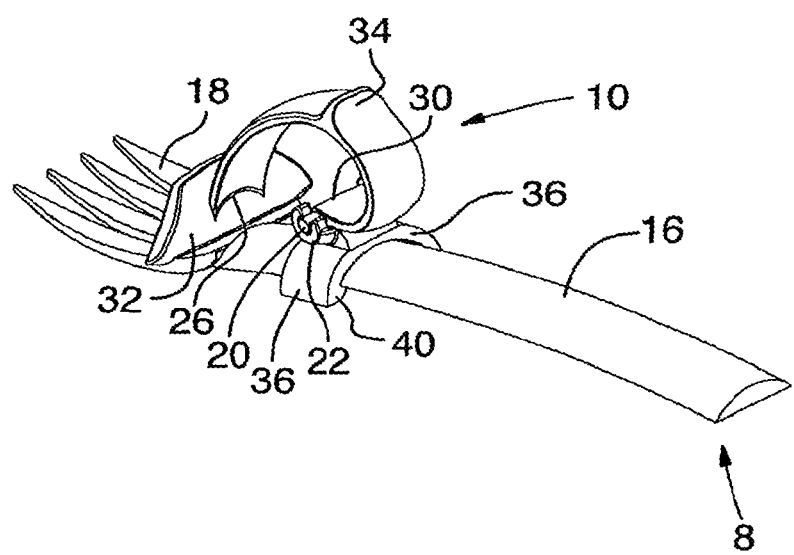
FIG. 7B is a perspective illustration of a further embodiment of this invention for a fork with an attachable and detachable mounting means.
Figure 8:
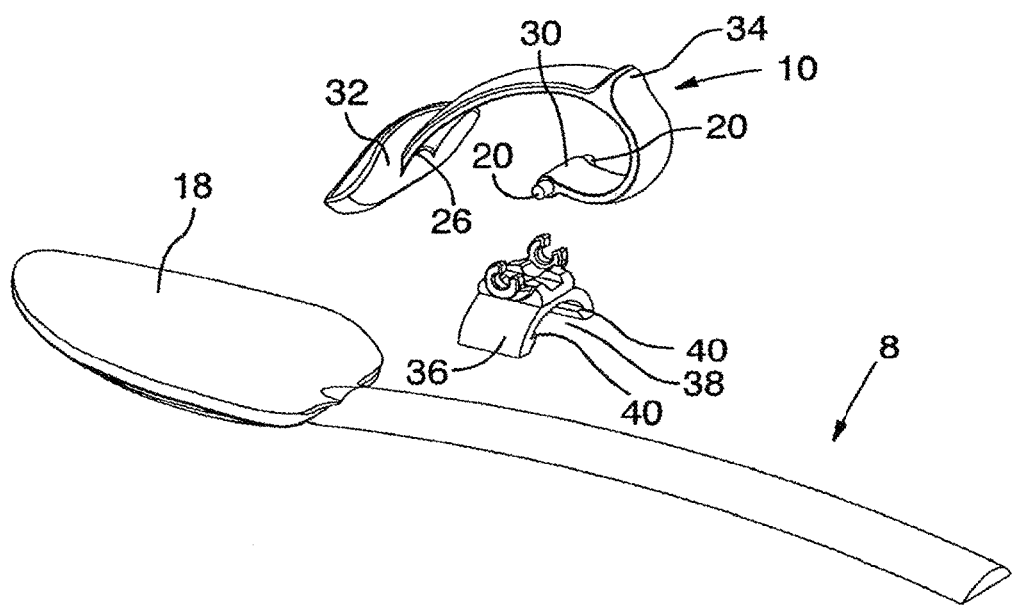
FIG. 8 is an exploded perspective illustration of the embodiment of FIG. 7A.

Once the resilient arm 10 is mounted to the handle of the fork or spoon, it is ready for use in the manner as shown in FIGS. 7A and 7B to then assert pressure as shown sequentially moving from FIG. 5A to FIG. 6A for operation. The user can operate the serving utensil by gripping the gripping portion 16 of the handle and pushing the resilient arm 10 forwardly by asserting thumb pressure the area below the thumb locater 34. An individual's thumb will move the scraper-remover 32 forwardly towards the service end of the food receptacle 18 as shown, moving from FIG. 5A to 6A. Thus, the curve of the resilient arm 10, existing during non-use, will begin to flatten under the handle, during use, so that the scraper-remover 32 will push forward and scrap the surface of the food receptacle 18 and, as well, push the food off of the food receptacle 18.

It will be apparent that if the resilient arm 10 is a bowed arm, it must be made from a resilient plastics material to permit for the resilient transformation of the shape of the bowed contour of the resilient arm 10.

The configuration of the mounting means which determines how the serving scraper is mounted to the serving utensil can vary. The preferred embodiment is shown in the figures. In the preferred embodiments of the Figures, the female hinge member 22 is formed on the spoon and the male hinge member 20 is formed on the resilient arm 10, but the arrangement could be vice versa as well. In both cases, the mounting means is disposed to define an axis of rotation to permit hinged movement about the axis of rotation to effect movement of the scraping end 26 of the resilient arm 10.

As a further embodiment of the mounting means as shown in FIG. 8, where the mounting means include members formed separately and independent of both the handle and the resilient arm 10. In that case, there is a mounting base member 36 which in cross section has an inner concavity and an opening 38. Inwardly disposed locking members 40 are provided with sloped surfaces so that they are flexed outwardly to mount onto the shaft of the spoon 14 and reassert their position to hold the mounting base member 36 onto the spoon 14 due to the resilience of the material used to make the mounting base member. By forming the mounting means separately, with a mountable base member 36, standard pre-existing utensils can be fitted with resilient arms made in accordance with this invention. Regarding the mounting means, the mounting base member may be formed with any suitable type of means for securement of hte resilient arm 10.

In the embodiment shown, female hinge member 22 are formed on the mounting base member 36 and corresponding male hinge members 20 are formed on the resilient arm 10. In all other respects the design is analogous to those of the embodiments with resilient arm of the type that extends rearwardly, then up and forwardly pass the mounting means.

Figure 9:
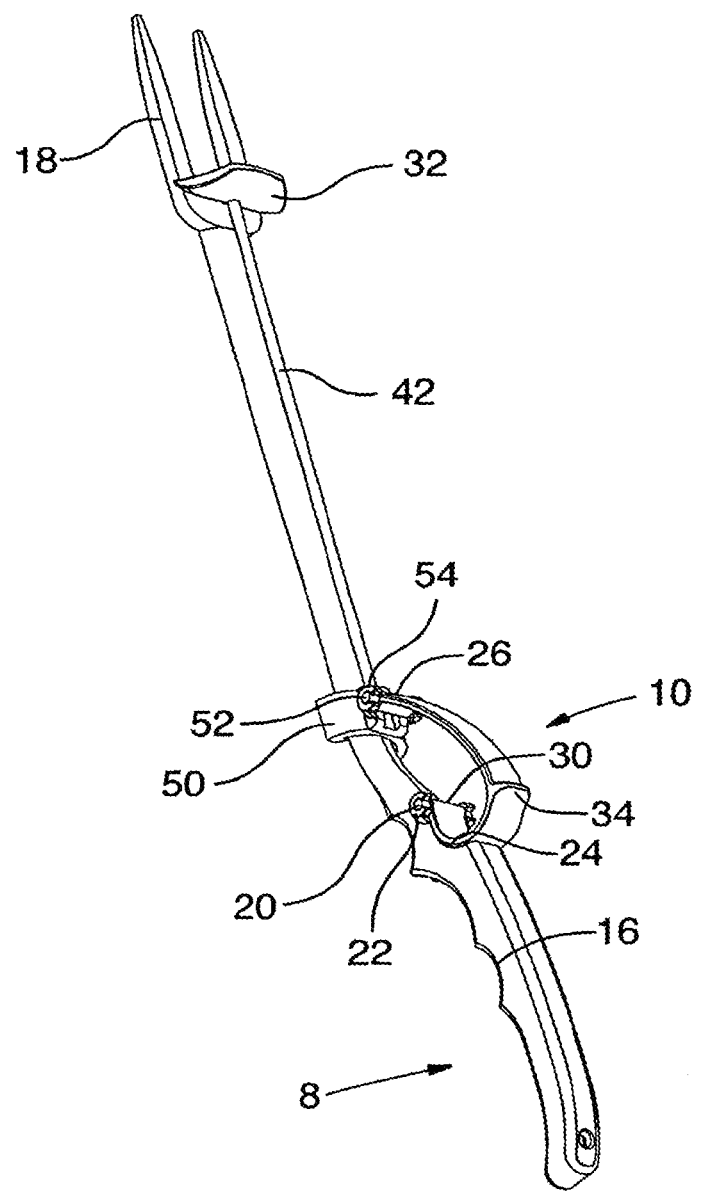
FIG. 9 is a perspective illustration of another alternative embodiment of this invention wherein there is provided an elongate interconnecting portion connecting the scrapping end of the resilient arm to the removal means.

It will also be apparent that the scraper-remover 32 can also be separated from the scraper end of the resilient arm 10 by an elongated portion such as a pushing rod 42 as shown in FIG. 9. As shown, the pushing rod 42 connects the scraper-remover 32, as a removal means, to the scraping end 26 of the resilient arm 10. The resilient arm 10 is mounted at its scraping end 26 to the handle to be slidably engaged for movement along the handle by base member 50. Base member 50 is formed with female hinged members 54 into which are fitted male hinged members 52 of the resilient arm. Use of an intermediately disposed elongated portion, such as pushing rod 42, permits adaption of this invention to multiple length sizes of serving utensils.

It will be apparent throughout that the parts of the serving utensil of this invention can be made of any material providing it is strong enough to bear the forces of the scraper during use for the particular application and utensil it is being used for. The composition of the material will depend on the characteristics desired by the manufacturer and user and are ordinary skill in the art. For instance, the serving utensil can be made of a structurally suitable plastic, wood or metal. However, the inventors prefer to use a plastics material because it is easily mouldable and the scraper remover (or scraper-server) can also be made from the same material if configured in dimensions which permit the resilience of the material to be used for the operation of the bowed arm.

In another alternative embodiment of the present invention, it is contemplated that the hinge means could be a "living" hinge. Accordingly, the removal apparatus and the handle could be integrally formed one with the other, or at least partially so.

In referring to the drawings, there is shown in FIG. 1 a serving spoon and a serving fork where each of these dispensing utensils include a holding end referred to generally by the numeral 16, a service end referred to generally by the numeral 18 and a food removal apparatus referred to generally by the numeral 10.

The embodiment illustrated in FIGS. 2 by a spoon is shown as an exploded view to further illustrate the resilient arm 10 male hinging member 20, compound resilient arm, user's thumb positioning location, food removal member 32, spoon body and the spoon body's female hinging member 22.

One skilled in the art will readily recognize that the hinging members 20 & 22 can be any appropriate means which would allow the hinging area to be securely fixed to the spoon body while also allowing the hinging member 20 to freely rotate about its axis.

The food removal member 32, or substance pusher 32, on the resilient arm 10 can be any appropriate shape that would facilitate its function. For a spoon or fork it could be shaped as shown or it could be wider and taller to meet a specific need or application. For a stabbing utensil such as a fork the shape of the substance pusher 32 need only dislodge the substance from the prongs and could consist of only a flat bar. The design features of the pusher 32 are many and not the specific focus of this invention. The pusher 32 of this invention can and will most likely be custom designed to meet the need of a specific utensils requirements, purpose, application and function.

The side view of an embodiment of the invention is illustrated in FIG. 3A. This view shows the primary curve of the compound curve of the resilient arm 10 illustrating its shape and the relative positioning of the substance pusher 32 and the hinging member 20.

The shape of the primary curve, beginning at the hinging member 20, starts in a direction towards the utensil's holding end then curves up to loop around and down towards the service end where it connects to the substance pusher 32.

The side view of the embodiment of the spoon specifically compatible with the embodiment of FIG. 3A is illustrated in FIG. 1 and shows a user's hand placement relative to the spoon and resilient arm 10.

Figure 4A:
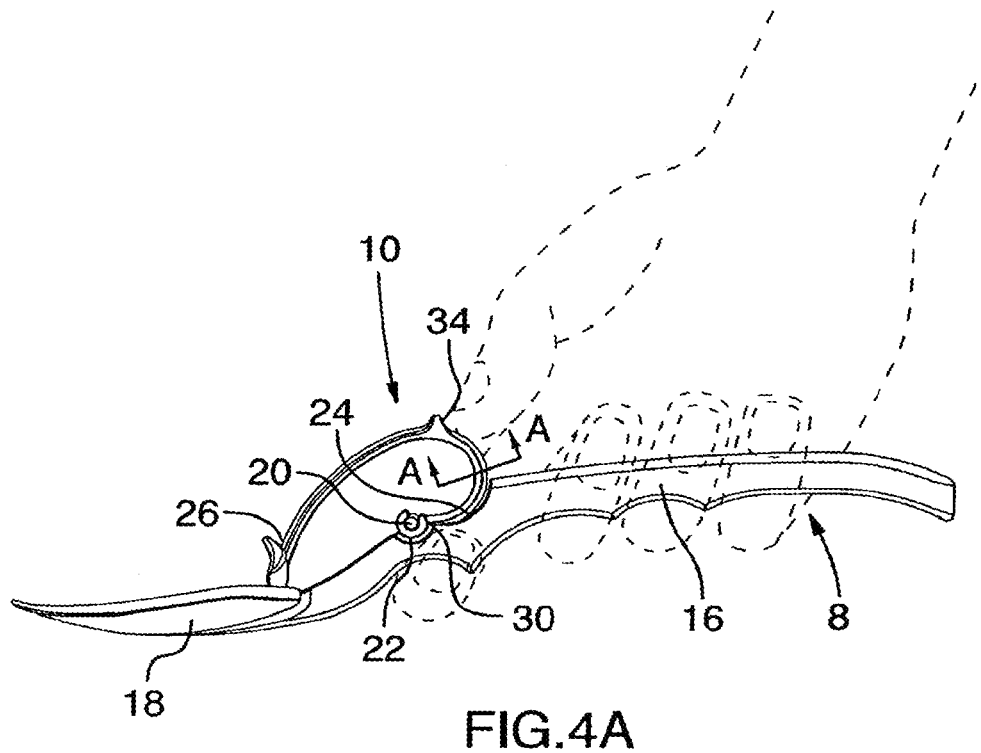
FIG. 4A illustrates a side view of a spoon of FIG. 1A with a user's hand positioned on around the gripping portion and thumb placed on the resilient arm.
Figure 4B:
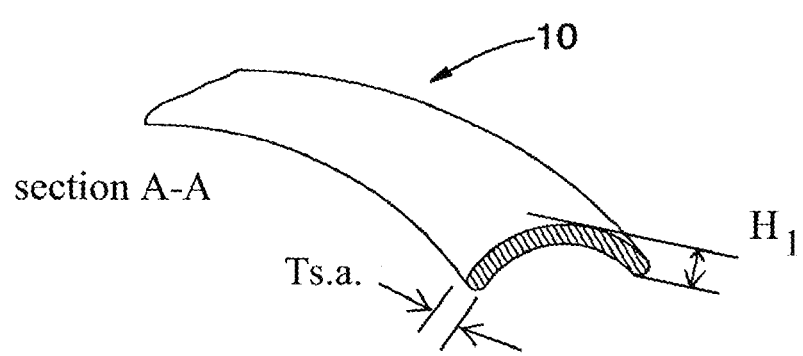
FIG. 4B is a cross section taken along lines A-A of FIG. 4A.

A section view of an embodiment of the resilient arm is illustrated in FIGS. 4a and 4b where cross section AA shows the secondary curve in the resilient arm 10 compound curve where this contour is shown when the resilient arm 10 is un-actuated and in a static state.

In FIG. 3B, the alternative embodiment comprises a resilient arm 10 that is not curved across its width, but instead is made from spring steel that is substantially flat and straight across its width, having a substantially constant thickness. The substance pusher 32 and the hinge 20 are each made from a suitable plastic material.

The embodiment illustrated in FIGS. 5A shows the dynamics of the hand motion required to partially extend the resilient arm 10. An individual's thumb will move the resilient arm 10 and food removal member 32 forward towards the service end of the utensil where the primary curve of the resilient arm 10 will roll out, similar to a wheel, under the thumb about hinging members 20 and 22. This action will begin to uncoil or straighten out the resilient arm 10, which will in turn move the pusher 32 in a somewhat linear fashion down the surface of the utensil's service end.

The design of the resilient arm's 10 primary curve provides for an ergonomic design but the shape of this curve also provides a means to translate a substance pusher 32 the necessary distance down the length of the utensil's service end. The resilient arm's 10 coil of material may be compact, user friendly, ergonomic, and aesthetically pleasing. As well it provides an uncoiled length capable of translating the substance pusher 32 down the length of the utensils service end as it is uncoiled by an individuals thumb.

Section BB of the compound resilient arm 10 is illustrated in FIGS. 5a and 5b and shows how the arch of the compound curve's secondary curve opens up to become a bit flatter as the compound resilient arm 10 is flexed to become straighter. The changing shape or flattening profile of this cross sectional curvature BB reduces the spring constant (reference Hooks law & engineering mechanics) of the compound spring arm thus reducing the force needed to depress the mechanism. As well the dynamics of these 2 straightening curves: resilient arm 10 and its cross sectional curvature, acts to minimize the bending stresses on the arm's material (reference engineering mechanics), which in turn increases the effective elastic life of the mechanism.

The flattening of the cross sectional curvature of the resilient arm's 10 secondary curve reduces the internal moment forces around the Z axis which occurs within the material as it is being actuated thus reducing the force needed to actuate the resilient arm 10. The dynamics of these two compound curves enables the resilient arm 10 to be constructed of a thinner cross sectional thickness Ts.a. (see FIGS. 4a, 5a & 6a). The thinner cross sectional thickness Ts.a. minimizes the compression stress that is created in the top surface of the resilient arm material and tension stress created in the bottom surface of the resilient arm material as the spring arm is flexed towards a straighter profile.

The compound curve's ability to reduce the stress within the material provides the resilient arm 10 with a greater range of elastic flexure and longer useful life of elastic flexibility.

The increased elastic flexibility of the resilient arm 10 of this invention has allowed the design of the resilient arm's 10 curvature to be a smaller tighter curve and it has enabled the design of the resilient arm 10 to begin by head back towards the holding end of the utensil before curving towards the service end of the utensil and this looping, curvature of the resilient arm 10 provides a rolling ribbon of material to place the thumb on which as the thumb moves forward the resilient arm 10, pivoting about the hinge means 20, will seem to roll like a wheel under the motion of the thumb.

Figure 10:
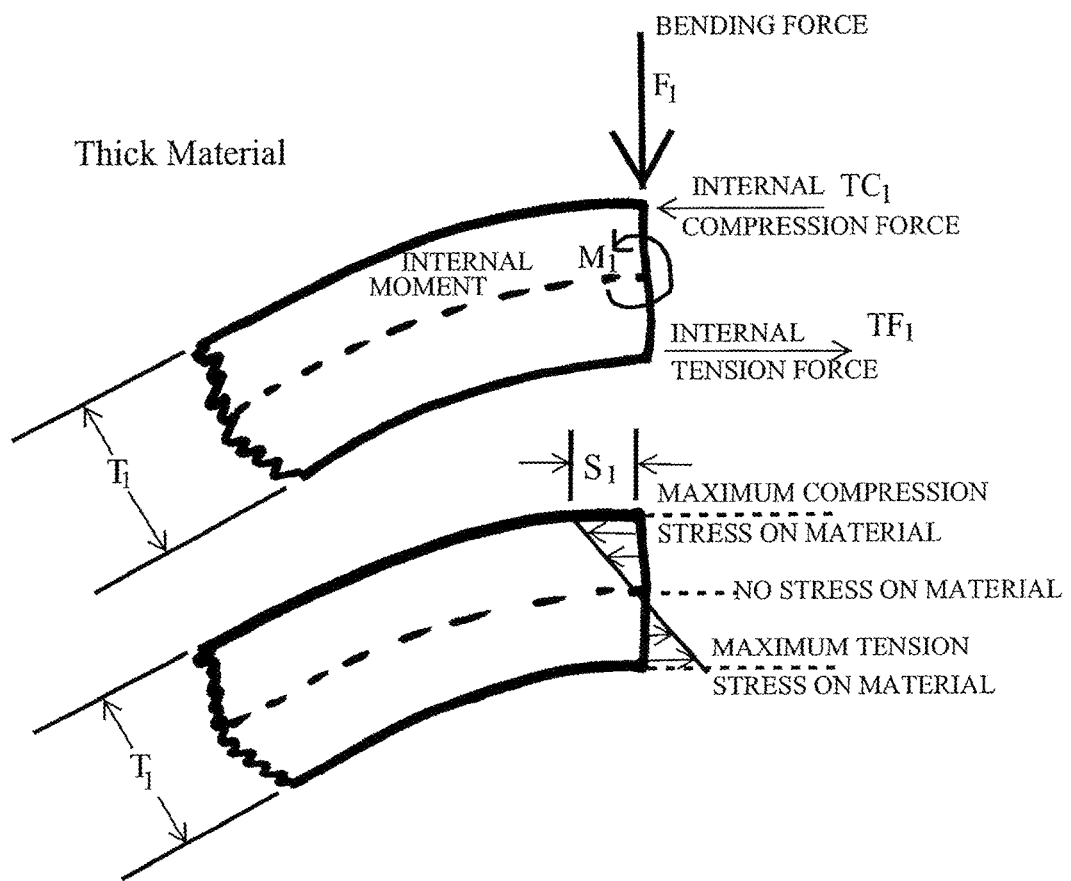
FIGS. 10 and 11 are diagrammatic representations of forces and stresses involved when a thick and a thin material are bent.
Figure 11:
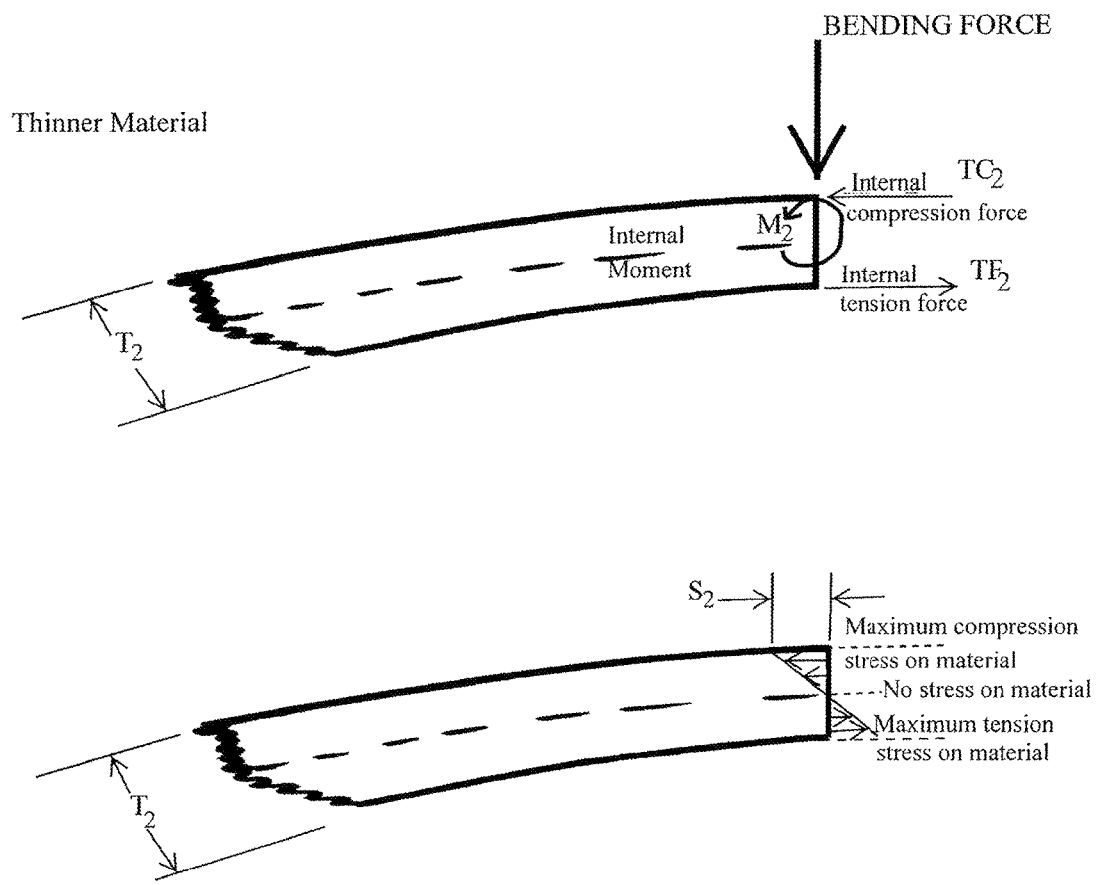

According to engineering mechanics, bending (also known as flexure) characterizes the behavior of a structural element, which is subject to a load. When material is subject to a bending force, the thicker a material is, the larger the stress will be on the surface of that material. For example if a thick piece and a thin piece of the same material are bent by the same amount the thick piece of material will experience a much larger amount of stress across its surfaces than the thinner piece. The thinner material will have a greater range of flexure than a thicker piece, which if subject to the same degree of flexure will yield, fatigue, weaken, crack and fail far before the thinner piece. In material under the same deflection conditions where T2 is <T1 ; F2 will be <F1 , TC2<TC1, TF2<TF1, S2<S1 & M2<M1 (see FIGS. 10 and 11).

Figure 12:
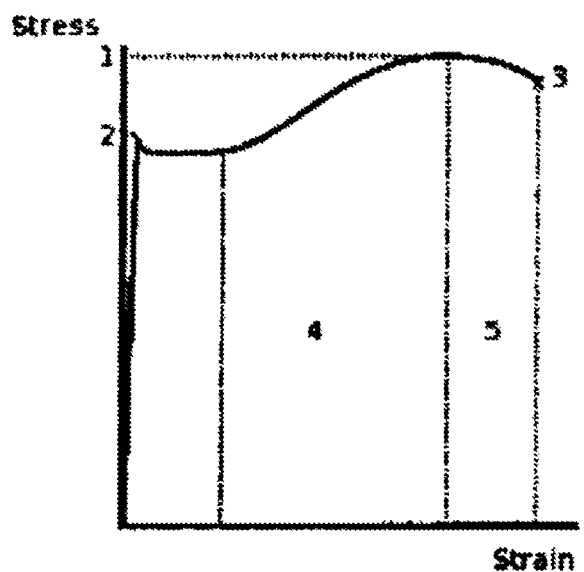
FIG. 12 is an exemplary plot of a typical stress vs. strain curve for ductile materials.

The thick piece of material is stiffer than a thin piece and the thicker piece will have a smaller range of elastic flexure because the compression and tension stresses experienced in the surface of a thicker material will cause the thicker sample to yield before the thinner material will. FIG. 12 shows a plot of a typical stress vs. strain curve for ductile materials.

The nature of the resilient arm 10 of this invention is that the cross sectional profile becomes thinner as the resilient arm 10 is flexed H3<H2<HI. (Reference FIGS. 4a, 5a & 6a).

For the resilient arm 10 of this invention in the un-flexed static state, the Hl dimension of FIG. 4a is comparable to the T1 dimension. The shape of the cross sectional profile provides a thickness or height H1 dimension that produces a greater rigidity of the resilient arm 10. The arching cross sectional shape of the secondary curve provides the rigidity and strength of the resilient arm 10 while allowing the thickness Ts.a. of the material itself to be thinner than if the same rigidity were accomplished with a rectangular cross section or otherwise.

For the function of this invention, the resilient arm 10 material needs to be thin so that the material doesn't yield as the resilient arm 10 covers the range of flexure needed to in order to become straightened.

The compound curve of the resilient arm 10 provides the food removal apparatus with the flexibility and resiliency needed in order to extend and return to its original static state shape as well this changing shape reduces the spring constant (reference Hooks law & engineering mechanics) within the material which relaxes the pusher 32 making it easier to actuate as it is extended.

The embodiment illustrated in FIGS. 6 shows the dynamics of the hand motion required to fully extend the food removal apparatus.

Section CC of the compound resilient arm 10 is illustrated in FIGS. 6a and 6b and shows how the curvature of this arch has opened up even further to become flatter as the compound curves of the resilient arm 10 are flexed.

The compound curves of the resilient arms 10 design also provides for additional stress distributing and elastic enhancing dynamics within the resilient arm 10, which further enhance its performance and durability.

As the two curve of the resilient arms 10 compound curve straighten out and tend towards lying in the same plane as in FIG. 6a the material on the center line of the resilient arm 10 will be compressed and the material on the outside edges of the resilient arm 10 will be in tension. This is due to the fact that the material on the centerline of the resilient arm 10 covers a longer linear distance than the material on the outside edge. For example, if you were to draw a line from the substance pusher 32 to the hinging means 20 following the centerline, this line would be longer than a line, which followed the outside edge. The compound curve feature of the design means that as the mechanism is actuated and the compound curves of the resilient arm 10 straightens out to approach the same plane, the length of the material on the outside edge and the length of the material on the centerline will approach the same length and be forced to find an equilibrium. The material on the outside edge will be stretched as the material on the centerline is compressed.

The dynamic compound curve design of this invention distributes the forces and stresses within the resilient arm 10 more evenly throughout the entire resilient arm 10 so as to avoid any areas of high stress or strain concentration, which could ultimately result in fatigue of the material which would result in yielding or fracture, reducing the useful life of the apparatus.

There is shown in FIGS. 7a and 7b another embodiment illustrated by a standard type spoon and a standard type fork where each consists of a holding end, a service end, an attachable and detachable hub referred to generally by the numeral 36 connected to these standard utensils and the food removal apparatus of this invention.

Another embodiment illustrated in FIGS. 8 by a standard typical spoon is shown as an exploded view to further illustrate the attachable and detachable hub 36, which allows the apparatus of this invention to be mounted to a standard spoon where the hubs 36 attachment means is shown in the form of a snap on snap off style clip but one skilled in the art will readily recognize that for the varied usefulness of this embodiment any appropriate means of attachment may be applied be it temporary or permanent in nature. The hub's 36 hinging means 22 is shown in the form of a female hinging connection compatible with the mechanism's male hinging means 20 but one skilled in the art will readily recognize that a number of effective alternatives exists.

In addition to these standard sized utensils one skilled in the art can see how it would be possible to adapt the function of the apparatus to a barbeque fork as shown in FIG. 9 where the service end and the holding end is typically separated by a long arm.

A guided shaft 42 could be fitted in between the substance pusher 32 and where the substance pusher 32 connects to the resilient arm 10 in order to translate the thumb motion down the long arm of the barbeque utensil to the substance pusher 32. The substance pusher 32 would be attached to the service end by means, which would facilitate sliding motion. The guided shaft 42 would connect the substance pusher 32 with a guide 50, which would attach to the long arm of the barbeque utensil in such a way so as to be able to slide to and fro along its length as the resilient arm 10 is being actuated. The guide 50 shown is one representation of how the shaft 42 could be guided but one skilled in the art will readily recognize there are numerous different means in which this translation could be accomplished.

The resilient arm 10 functions similarly to that described above except that here the resilient arm 10 directly actuates a guide 50 and not a substance pusher 32. There are hinging attachment means 54 represented on this guide 50 and compatible hinging attachment means 52 on the resilient arm 10 which appropriately transfer the motion of the resilient arm 10 to the guide 50, long arm and in turn substance pusher 32.

The barbeque utensil illustrated in FIG. 9 is a fork but one skilled in the art can see how the mechanism of this invention could be easily adapted for a spatula, spoon and other such utensils.

In the above mentioned embodiments the preferred material would be plastic but one skilled in the art will realize that a number of resiliently elastic material could work such as metal or specifically spring steel etc.

In these embodiments discussed above the resilient arm 10 makes use of a compound curve which is an appropriate design feature but not entirely necessary in all production situations and material applications. In situations where the construction material is plastic the performance of the mechanism benefits greatly by the compound curve design feature but depending on the choice of plastic materials the secondary curve of the compound curve may or may not be desirable or necessary. In situations where the construction material is metal the performance of the mechanism can benefit from the compound curve design but the secondary curve would most likely be unnecessary especially if the resilient arm 10 is constructed of a spring steel or a composite of spring steel and plastic. A rectangular or other cross section for the resilient arm 10 could be sufficiently durable and perform suitably.

In another aspect of the present invention, there is a utensil comprising a handle having a gripping portion that is grippable by a user. The handle has a arm-receiving recess therein for receiving a portion of the resilient arm therein.

There is a substance carrying means operatively connected to the handle. The substance carrying means is operatively connected to the handle in downwardly offset relation, There is also a resilient arm having a thumb engaging portion extending, at least in part, substantially vertically upwardly from the handle, and an elongate interconnecting portion extending forwardly from the thumb engaging portion to situate a substance engaging portion at the substance carrying means.

The resilient arm is resiliently deformable by a user's thumb to move the substance engaging portion with respect to the substance carrying means, to thereby remove a substance from the substance carrying means.

The present invention further comprises a mounting means disposed on at least one of the resilient arm and the handle, for mounting the resilient arm to the utensil. The mounting means comprises a hinge means, and the resilient arm is connected to the handle by the hinge means. The hinge means comprises a male hinge member and a female hinge member.

The resilient arm has a tightly curved thumb engaging portion extending upwardly from the handle, and has a thumb engaging portion extending upwardly and rearwardly from the handle. Further, the resilient arm is curved longitudinally along its length and is curved laterally across its width, and wherein deforming the resilient arm such that the longitudinal curve of the resilient arm is decreased, effects a corresponding decrease in the lateral curve of the resilient arm.

In another aspect, the present invention comprises a removal apparatus for use with a utensil. The removal apparatus comprises a resilient arm having a mounting means for mounting the removal apparatus to the utensil, and a thumb engaging portion extending, at least in part, substantially vertically upwardly from the mounting means. An elongate interconnecting portion extends forwardly from the thumb engaging portion to situate a substance engaging portion in place so as to be disposed at the substance carrying means of the utensil. The resilient arm is resiliently deformable by a user's thumb to move the substance engaging portion with respect to the substance carrying means, to thereby remove a substance from the substance carrying means, when the removal apparatus is mounted via the mounting means on the utensil.

As can be understood from the above description and from the accompanying drawings, the present invention provides a utensil that has features that are unknown in the prior art, and that meets the objects of the present invention.

We claim:

1. A utensil comprising:
   a handle having a gripping portion for gripping the utensil;
   a receptacle having a distal service end and a proximal end, and wherein said receptacle is operatively connected at said proximal end to the handle;
   a curved spring arm having a first mounting end and an opposite second end, wherein the first mounting end is operatively connected in hinged relation to the handle forwardly of the gripping portion and wherein the curved spring arm comprises a first resiliently flexible portion that predominantly extends from the first mounting end towards the gripping portion of the handle and a second portion that extends from the first resiliently flexible portion towards the receptacle;
   a remover operatively connected to the opposite second end to be disposed adjacent the receptacle;
   wherein said hinged relation defines an axis of rotation oriented substantially transversely to the handle to permit hinged movement of the curved spring arm about the axis and said hinged movement causes at least the first resiliently flexible portion of the curved spring arm to straighten; and,
   wherein said hinged movement of the curved spring arm about the axis and said straightening of at least the first resiliently flexible portion of the curved spring arm, together cause movement of the remover along the receptacle towards the distal service end.

2. The utensil of claim 1, wherein the first resiliently flexible portion and the second portion of the curved spring arm are formed of a unitary piece of material.

3. The utensil of claim 1, wherein the first mounting end of the curved spring arm is operatively connected in hinged relation to the handle by a hinge member.

4. The utensil of claim 1, wherein the curved spring arm is mounted in removable and replaceable relation to the handle.

5. The utensil of claim 1, wherein the remover is formed with the curved spring arm.

6. The utensil of claim 1, wherein the remover is operatively connected to the opposite second end via a rod.

* * * * *